United States Patent
Sasagawa

(10) Patent No.: US 6,243,357 B1
(45) Date of Patent: *Jun. 5, 2001

(54) LAN EMULATION SYSTEM AND ATM SWITCH

(75) Inventor: Yasushi Sasagawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,873

(22) Filed: Mar. 9, 1998

(30) Foreign Application Priority Data

Sep. 30, 1997 (JP) .................................. 9-267300

(51) Int. Cl.⁷ .................................................. H04L 12/56
(52) U.S. Cl. ........................................ 370/216; 370/395
(58) Field of Search .............................. 370/216, 395, 370/401, 385, 390, 392, 400, 404, 405

(56) References Cited

U.S. PATENT DOCUMENTS

| | | | |
|---|---|---|---|
| 5,258,977 | * 11/1993 | Walker et al. | 370/395 |
| 5,398,236 | * 3/1995 | Hemmady et al. | 370/218 |
| 5,812,552 | * 9/1998 | Arora et al. | 370/401 |
| 5,828,665 | * 10/1998 | Hasakl | 370/387 |
| 5,835,481 | * 11/1998 | Akyol et al. | 370/216 |
| 5,982,773 | * 11/1999 | Nishimura et al. | 370/395 |

\* cited by examiner

*Primary Examiner*—Douglas Olms
*Assistant Examiner*—Ken Vanderpuye
(74) *Attorney, Agent, or Firm*—Helfgott & Karas, P.C.

(57) ABSTRACT

A LAN emulation system is capable of avoiding a fault without making a line dual by a local dual structure on the premise that a LAN emulation server is made dual. An ATM switch, to which a LAN emulation terminal is connected, is provided with a line fault detecting unit, a routing table in which to define a correspondence a specified address to a line, and a line status table rewritten based on a result of detection by the fault detecting unit. A LAN emulation configuration server (LECS) connected to the ATM switch is constructed to have a dual structure. If a fault occurs in a connection to the LAN emulation configuration server, it is feasible to easily implement a connection to the dual LAN emulation configuration server and, because of no necessity for making dual the line itself, to easily construct a fault avoiding system.

5 Claims, 8 Drawing Sheets

LAN EMULATION SYSTEM AND ATM SWITCH

BACKGROUND OF THE INVENTION

The present invention relates to a technology effective in an application to a-LAN emulation technology in an ATM communication network.

A system for actualizing a LAN emulation in an ATM network involves a data transmission between LAN emulation terminals connected to an ATM switch via the ATM network. Connected to the ATM switch are a group of servers for actualizing a LAN emulation function such as, e.g., a LAN emulation server (LES), a Broadcast and Unknown Server (BUS) and a LAN emulation configuration server (LECS).

If a fault occurs in the server group for the LAN emulation, it follows that a trouble is caused in communications between LAN emulation clients. In the great majority of cases, there exists only one system of the LAN emulation configuration server (LECS) in the network, and, if the fault occurs in this LECS, there must be a high possibility in which the whole network might fall into a system-down.

There can be considered the following contrivances for avoiding the above system-down.

(1) An implementation system, i.e., the server group for providing the LAN emulation service function is constructed as a dual structure.

(2) The implementation system for providing the LAN emulation service function incorporates a line dual function.

(3) The ATM switch itself incorporates the line dual function.

In the above contrivances (2) and (3), it is required that the dual function based on the same procedures be incorporated into the implementation system (the server group) connected to an opposite equipment, i.e., the ATM switch existing on the opposite side and therefore be incorporated at a plurality of places. This conduces to a problem in which the incorporation of the function itself becomes heavy.

Accordingly, it is considered optimal to adopt the contrivance (1), however, there has been made no examination about a concrete method of actualizing it.

It is a primary object of the present invention, which was contrived in view of the point described above, to provide a LAN emulation system capable of avoiding a fault without making the line dual by a local dual structure on the premise that a LAN emulation server is made dual.

SUMMARY OF THE INVENTION

To accomplish the above object, according to a first aspect of the present invention, an ATM switch, to which a LAN emulation terminal is connected, includes a line fault detecting unit, a routing table in which to define a correspondence between a specified address and a line, and a line status table rewritten based on a result of detection by the fault detecting unit. Further, a LAN emulation configuration server (LECS) connected to the ATM switch is constructed to have a dual structure.

A line status is monitored, and, if a fault occurs in a connection to the LAN emulation configuration server, it is feasible to easily make a connection to the dual LAN emulation configuration server. Besides, the line is not required to be made dual, and hence a fault avoiding system can be easily constructed.

According to a second aspect of the present invention, in the LAN emulation system according to the first aspect of the invention, one or two or more LAN emulation execution servers and address set servers for the LAN emulation are connected to the LAN emulation configuration server, and the LAN emulation configuration server includes a server registration table in which to set a combination of a LAN emulation executing server connected to the LAN emulation configuration server and an address set server for the LAN emulation.

According to a third aspect of the present invention, in the LAN emulation system according to the second aspect of the invention, the LAN emulation configuration server is provided with a plurality of server registration tables, and the server registration table alternatively different is registered in each of the dual LAN emulation configuration servers.

According to the second aspect of the invention, the LAN emulation execution server is defined as a LES (LAN emulation Server) prescribed in an ATM Forum UNI Version 1.0, and the address set server for the LAN emulation is defined as a BUS (Broadcast and Unknown Server).

According to the first and second aspects of the invention, a content of the server registration table is changed per dual LAN emulation configuration server, whereby a load can be decentralized when a fault occurs due to an overload of the line.

According to a fourth aspect of the present invention, a well-known address for the LAN emulation configuration server is set as a specified address of the routing table.

The well-known address is a well-known LECS address prescribed in the ATM Forum UNI Version 1.0.

Thus, the well-known LECS address is used as the specified address of the routing table, thereby making it possible to set routing while steering clear of a line with an occurrence of fault by use of a SETUP signal transmitted from the LAN emulation terminal (LEC).

According to a fifth aspect of the present invention, an ATM switch connected to a LAN emulation configuration server comprises a control unit provided corresponding to two or more lines, a switch unit for switching the line, a cell inserting/extracting unit for inserting and extracting cells transferred via the line, a signaling processing unit for detecting a fault in the line, and a line correspondence data unit including a routing table in which to define a correspondence of the well-known address to the line and a line status table rewritten based on a result of detection by the fault detecting unit. Then, the routing table is set so as to lead a connection to the well-known address from an external terminal to the LAN emulation configuration server selectively from the two or more lines on the basis of a change in the line status table.

With such a construction of the ATM switch, a fault avoiding system can be constructed simply by making the LAN emulation configuration server dual without making the line dual.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will be discussed with reference to the accompanying drawings.

Figure 1:
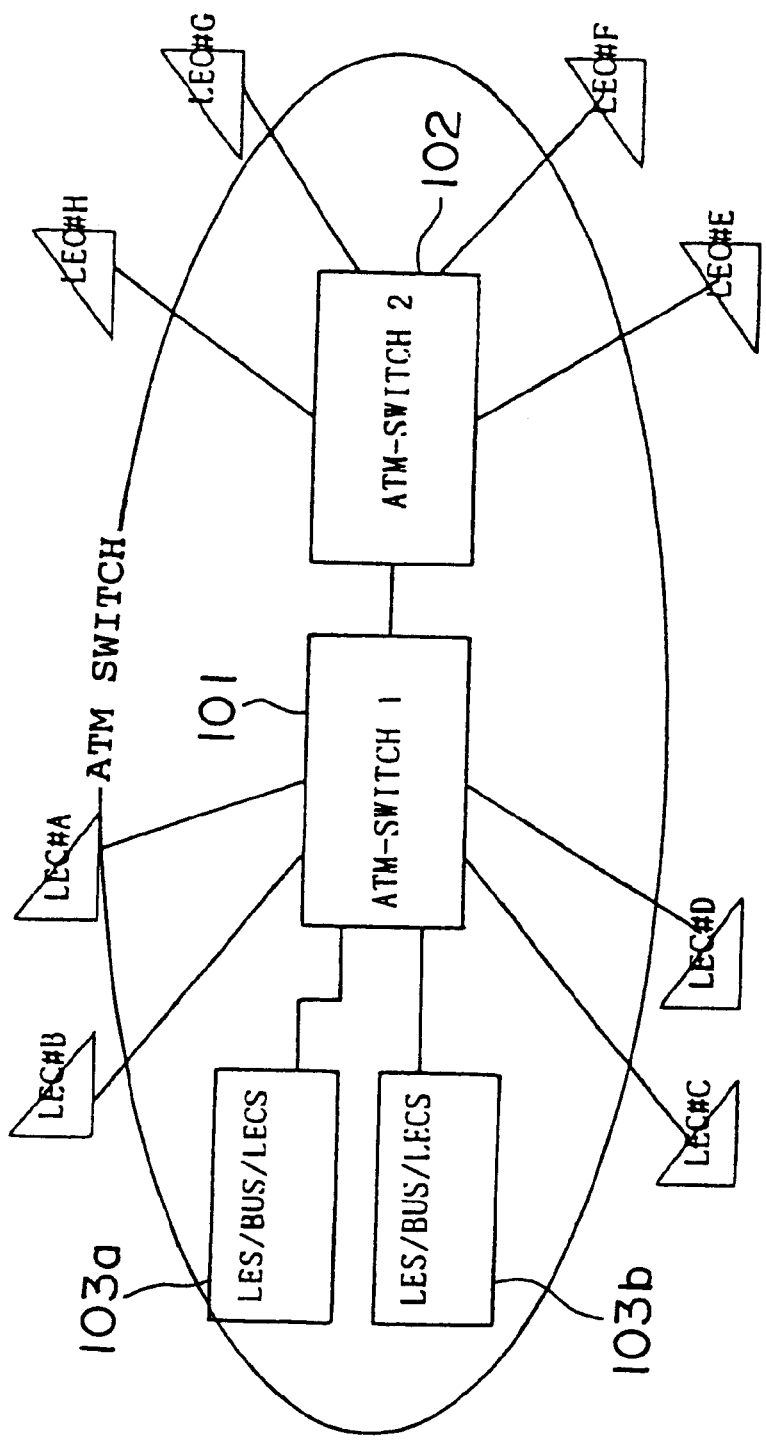
FIG. 1 is a block diagram showing a construction of a network for actualizing a LAN emulation system.

FIG. 1 shows a construction of a network system according to the present invention.

An ATM network is constructed of ATM switches 101, 102. LAN emulation terminals (LEC#A–LEC#H) are connected to these ATM switches 101, 102.

Dual LAN emulation configuration servers 103a, 103b are connected to the ATM switch 101, and manage communications between the LAN emulation terminals.

Figure 2:
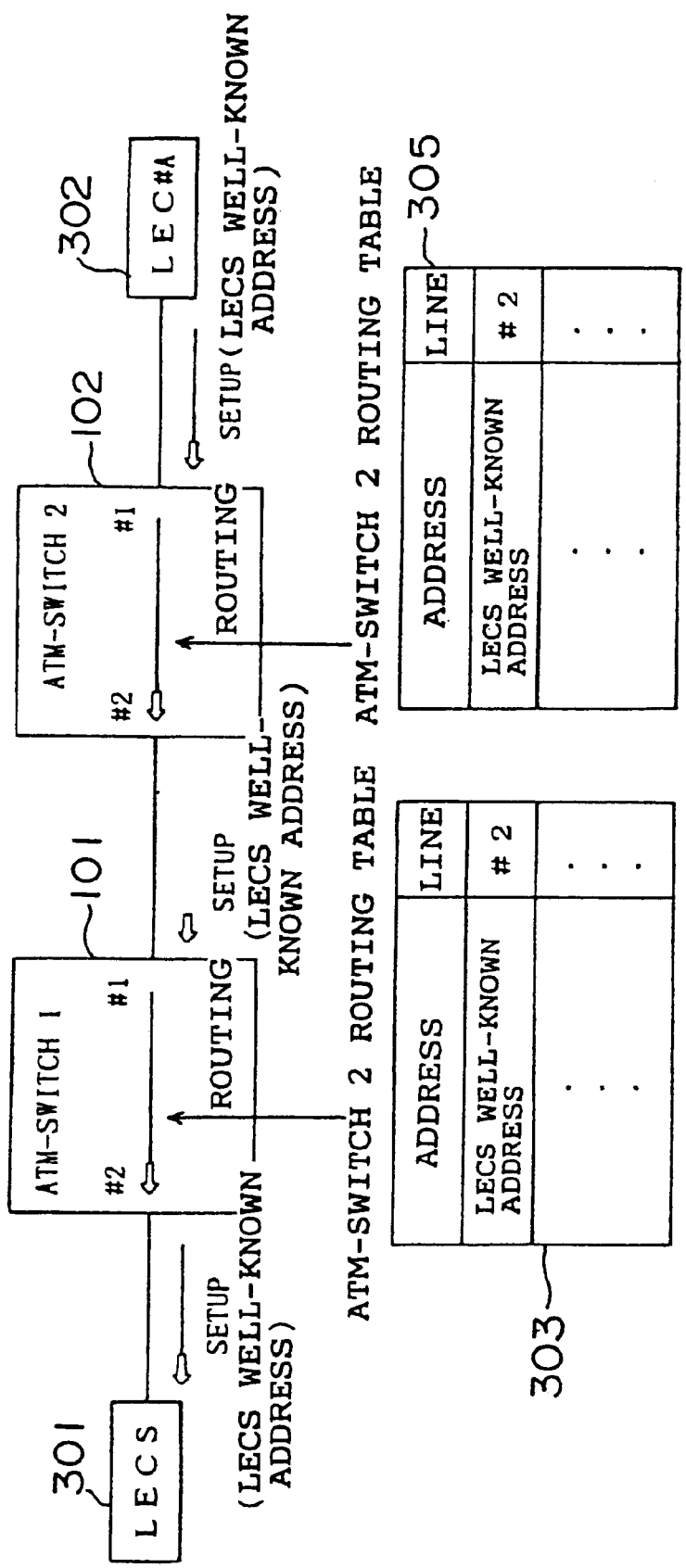
FIG. 2 is a block diagram showing a method of routing to a LAN emulation configuration server with a well-known address in the prior art.
Figure 3:
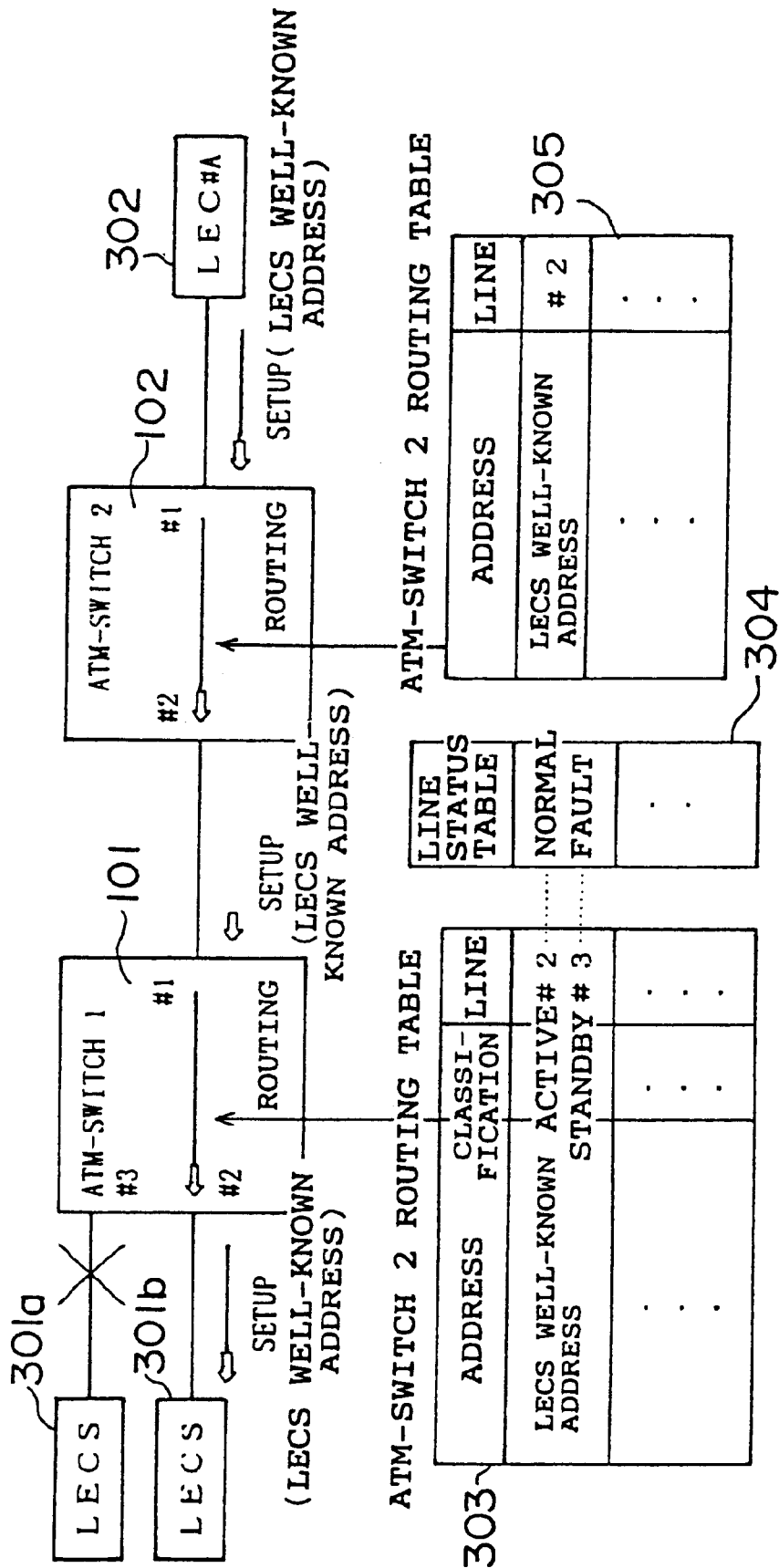
FIG. 3 is a block diagram showing a routing method to a LAN emulation configuration server with a well-known address in an embodiment of the present invention.

FIG. 2 shows structures of routing tables 303, 305 of the ATM switches 101, 102 in the prior art for a comparison. FIG. 3 shows a structure of a line status table as well as showing the structures of the routing tables 303, 305 in this embodiment.

According to the prior art, as shown in FIG. 2, well-known addresses are registered in addresses in the routing tables 303, 305. The ATM switch 102, when receiving a SETUP signal addressed to the well-known address from the LAN emulation terminal LEC#A, determines a line #2 with reference to the routing table 305, and transfers the same SETUP signal to the ATM switch 101.

The ATM switch 101 determines the line #2 corresponding to the relevant well-known address with reference to its own routing table 303, and transfers the SETUP signal to the LAN configuration server (LECS) 301 connected to this ATM switch 101.

By contrast, this embodiment has such differences from the prior art (FIG. 2) that, as shown in FIG. 3, the dual LAN configuration servers (LECS) 301a, 301b are connected to the ATM switch 101 which is further provided with a line status table 304, and items of line classifications (active/standby) are set in the routing table 303.

Referring to FIG. 3, it is assumed that a fault occurs in a line #3 between the ATM switch 101 and the LAN configuration server (LECS) 301a.

Referring again to FIG. 3, it is presumed that the line #3 be defined as an active line, while the line #2 be defined as a standby line when the fault happens. As for a fault detecting method, although it will be described in greater detail later on, the ATM switch 101 monitors the LAN configuration servers (LECS) 301a, 301b and, if a change appears in the status of one of these lines (i.e., if the fault occurs), rewrites the line status table 304. Then, the item of classification of the routing table is rewritten based on the line status table. A rewriting condition at this time is that the active-system line and the standby-system line are rewritten in such a case that "the fault occurs in the active-system line" while "the standby-system line is normal" and "a call-in is given to the well-known address".

This process being thus executed, the call-in is given to the well-known address not via the line #3 in which the fault has occurred but via the normal line #2.

Figure 6:
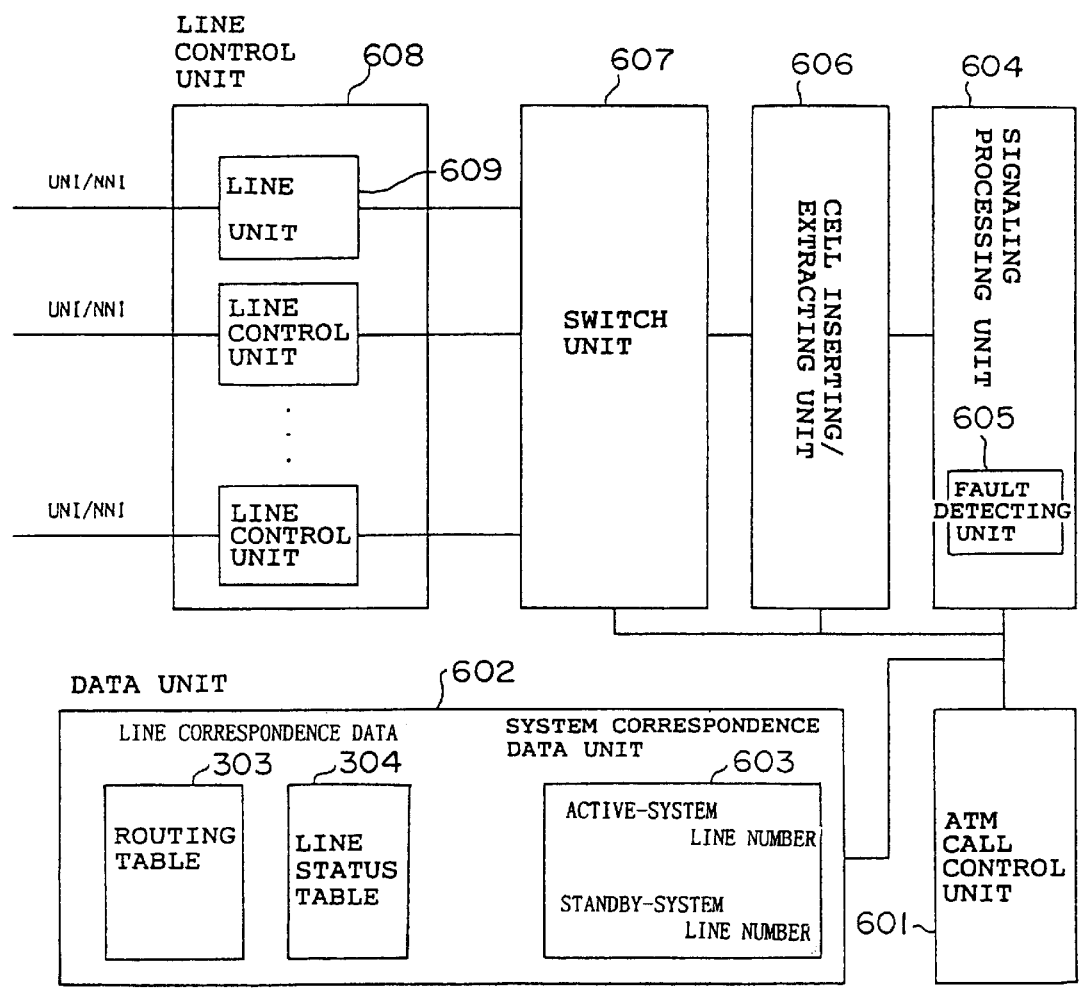
FIG. 6 is a functional block diagram showing an internal construction of an ATM switch in the embodiment of the present invention.

FIG. 6 is a block diagram illustrating an internal construction of the ATM switch 101.

A line control unit 608 accommodates a plurality of line controllers 1–N (609) ad incorporates a function of terminating an UNI/NNI interface.

A switch unit 607 has a function of exchanging ATM cells to be transferred on the cell unit.

A cell extracting/inserting unit 606 has a function of executing an extraction and an insertion of cells for signaling.

A signaling processing unit 604 incorporates a function of terminating L2/L3 of an ATM signaling protocol, and has line fault detecting unit 605.

An ATM call control unit 601 implements main control of the relevant ATM switch 101, and has a function of controlling a transmission and a receipt of an SVC call, a connection and a disconnection as well as controlling a routing process.

A data unit 602 includes a routing table 303, a line status table 304 and a system correspondence data unit 603. The data unit 602 manages data per system and data per line, and provided the ATM call control unit 601 and the signaling processing unit 604 with functions to register, delete, change and refer to the data.

Figure 7:
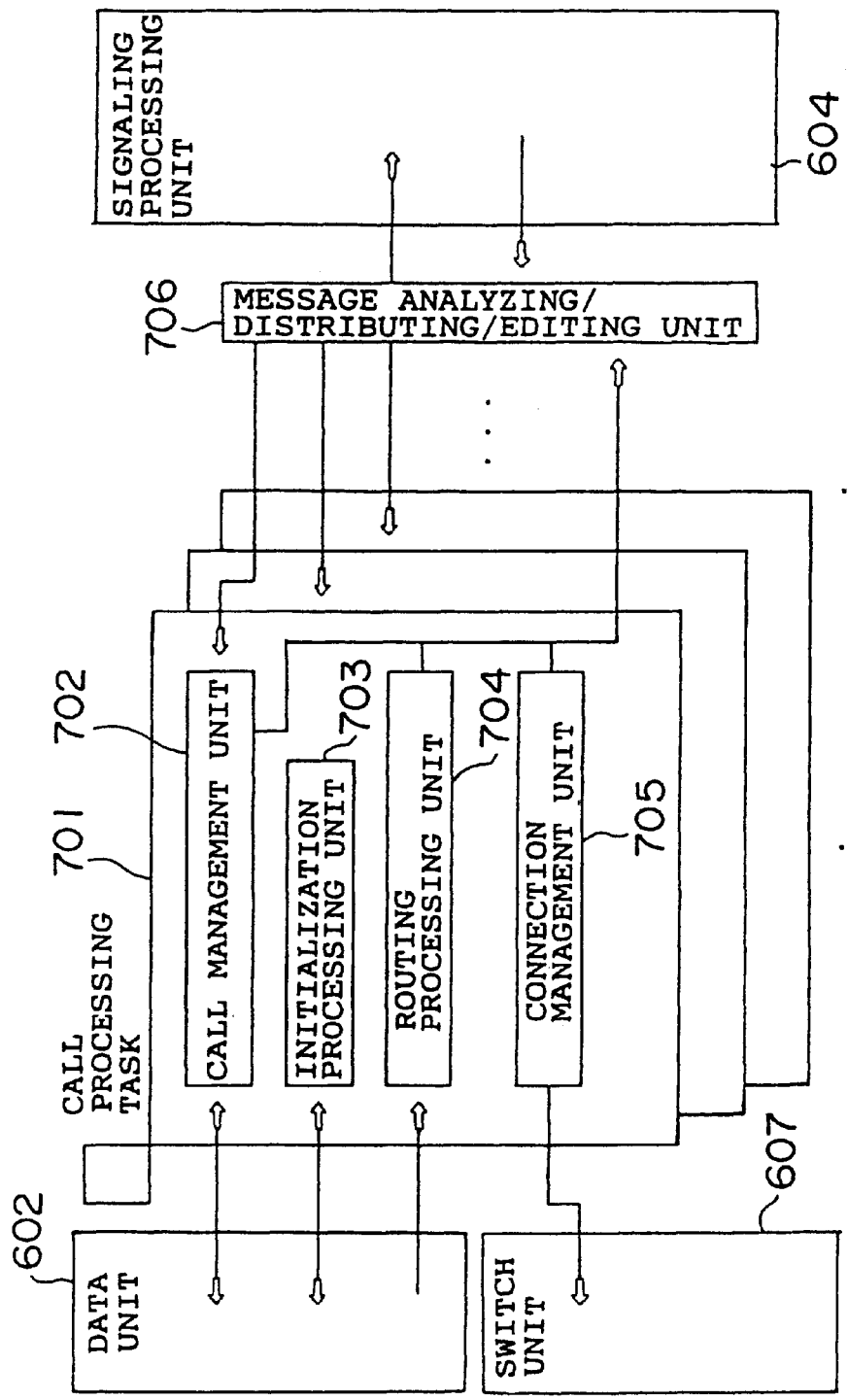
FIG. 7 is a functional block diagram of an ATM call control unit of the ATM switch in the embodiment of the present invention.

FIG. 7 shows functional blocks showing processes between the signaling processing unit 604, the data unit 602 and the switch unit 607, which are executed in the ATM call control unit 601.

Referring to FIG. 7, a call processing task designated by 701 has function of executing SVC call processes (of connecting and disconnecting the call, and managing a status of the call). Herein, a plurality of call processing tasks 701 operate in parallel.

A message analyzing/distributing/editing unit 706 incorporates a function of analyzing messages received from the signaling processing unit 604 and distributing these messages to the call processing tasks. Further, the message analyzing/distributing/editing unit 706 has also a function of editing the message requested for a transmission by the call processing task 701, and transferring the same message to the signaling processing unit 604.

The call processing task 701 is constructed of a call management unit 702, an initialization processing unit 703, a routing processing unit 704 and a connection management unit 705.

The call management unit 702 has a function of managing the call status.

The initialization processing unit 703 has a function of initializing a various items of data of the data unit 602, e.g., the routing table 303.

The routing processing unit 704 incorporates a function of analyzing a call-in address and a call-in sub-address and executing a routing process.

The connection management unit 705 has a function of managing a status of an SVC connection and controlling the switch unit 607.

Next, a procedure of setting the routing table in this embodiment will be explained.

To begin with, an active-system line number and a standby-system line number of the LAN emulation configuration server (LECS) are registered beforehand in the system correspondence data unit 603 via an external input device such as an unillustrated system console etc.

Then, similarly, the routing table 303 is registered with two or more line numbers corresponding to the well-known addresses.

Note that the fault detecting unit 605 of the signaling processing unit 604 detects a change in the status of the line, and the line status table 304 is rewritten based on a result of this detection.

To start with, the initializing process is executed by switching ON a power supply. At this time, however, the initialization processing unit 703 in the call processing task 701 of the ATM call control unit 601 refers to the LECS active-system line number of the system correspondence data unit 603 and, based on this line number, sets "active" in the item of classification corresponding to the well-known address of the routing table 303. Then, referring to the LECS standby-system line number of the system correspondence data unit 603, the initialization processing unit 703 sets "standby" in the item of classification of the routing table 303 that corresponds to this line number.

Further, "fault" is set in all the line status table.

Next, the signaling processing unit 604 monitors a status of each line in accordance with a procedure of a relevant layer, and rewrites the line status table 304 when the status changes. Herein, in a normal case, "normal" is set in the items of line statuses corresponding to "active" and "standby" when normal.

Next, a procedure of the rewriting process of the routing table when the fault happens will be explained with reference to FIG. 8.

At the first onset, the LAN emulation terminal transfers and receive information to and from the LAN emulation configuration server and, for this purpose, transmits the SETUP signal designating the well-known address to the ATM switch 101.

The ATM switch 101, upon receiving the SETUP signal (step 801), judges whether or not this is the well-known address (step 802). Herein, if judged to be the well-known address, with reference to the routing table 303 and the line status table 304, the ATM switch 101 judges whether the line in which the "active" is set in the item of classification of the well-known address, is normal or not (step 803).

Herein, if judged to be normal, the routing process is executed based on the routing table 303, and the LAN emulation terminal (LEC) is connected to the LAN emulation configuration server (LECS).

Next, the LAN emulation terminal (LEC) is connected to the LAN emulation server (LES) on the basis of the information obtained from the LAN emulation configuration server (LECS), and further connected to an address set server (BUS)for the LAN emulation owing to an address solving function possessed by the LAN emulation server (LES). The LAN emulation terminal comes into an operating status owing to the connections to the group of those servers.

Next, as explained in FIG. 3, if the fault occurs in the active-system LAN emulation configuration server (LECS) 301a or the line #3 corresponding to this server, the fault detecting unit 605 of the signaling processing unit 604 of the ATM switch 101 detects the fault in the line, and rewrites "normal" of the line status corresponding to "active" to "fault" in the line status table 304.

Next, the ATM call control unit 601 of the ATM switch releases the SVC connection from all the LAN emulation terminals (LEC) on the basis of the line fault notification given from the above fault detecting unit 605. All the LAN emulation terminals are thereby brought into the initial status.

Subsequently, the LAN emulation terminal (LEC) having become the initial status, when falling into a connection phase to the LAN emulation configuration server (LECS), retransmits the SETUP signal addressed to the well-known address to the ATM switch 101.

Figure 8:
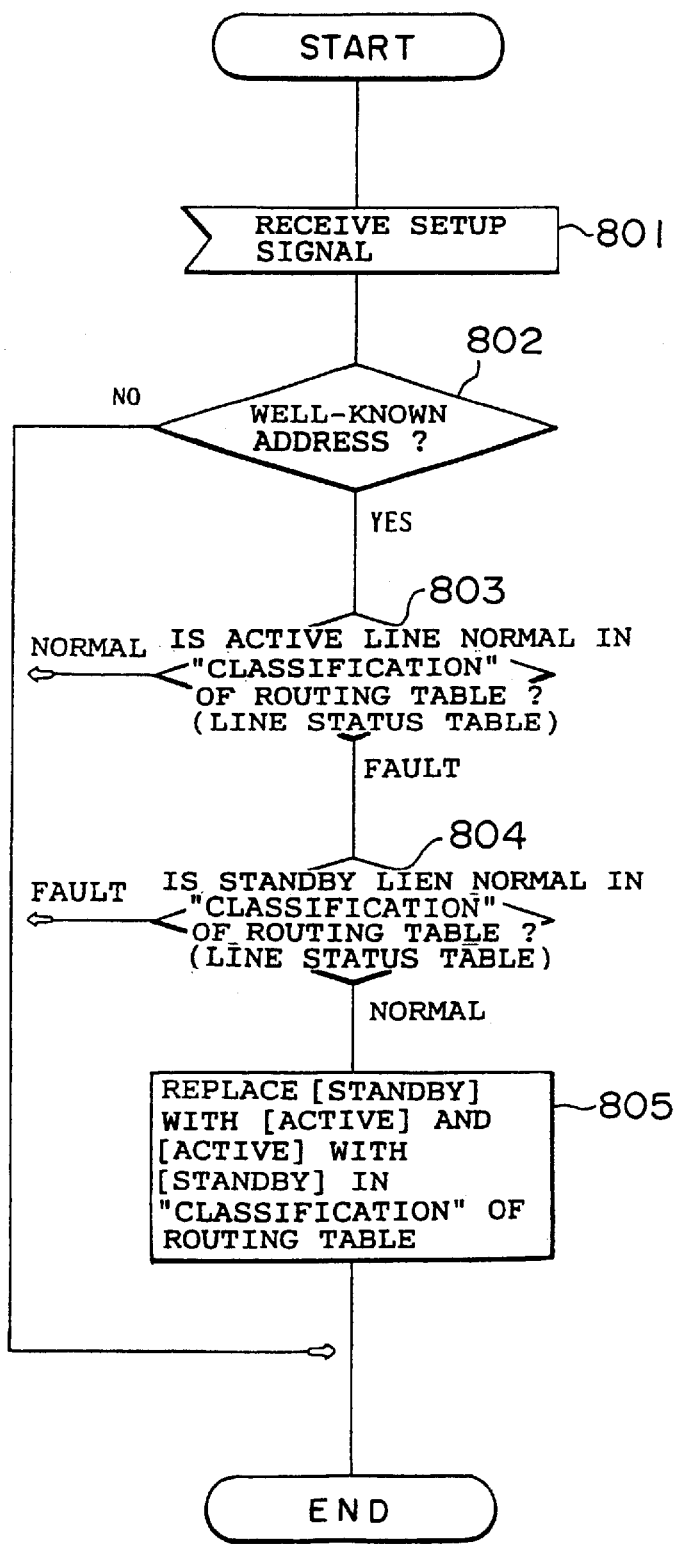
FIG. 8 is a flowchart showing a switching process to a standby system or an active system in a routing table in the embodiment of the present invention.

Herein, the ATM switch 101 re-executes the processing flow shown in FIG. 8.

Namely, the ATM call control unit 601 of the ATM switch 101 that receives the SETUP signal, when judging that this signal is addressed to the well-known address (steps 801, 802), refers to the routing table 303 and the line status table 304 in order to make a judgement in step 803. At this time, as discussed above, the line in which "active" is set in the item of classification of the routing table 101, is conceived "fault", and hence the judgement in step 803 becomes a negative logic.

Next, the ATM call control unit 601 judges whether the line in which "standby" is set in the item of classification of the routing table 101, is "normal" or not (step 804). Herein, if the standby line is judged to be "normal", "active" (#3) is replaced with "standby" in the routing table 101, and "standby" (#2# is replaced with "active" (step 805). FIG. 3 shows the thus rewritten state.

Subsequently, the routing process is executed in accordance with the rewritten routing table 303, and the LAN emulation terminal (LEC) is connected to the LAN emulation configuration server (LECS).

Next, the LAN emulation terminal (LEC) is connected to the LAN emulation server (LES) on the basis of the information obtained from the LAN emulation configuration server (LECS), and further connected to the address set server (BUS) for the LAN emulation owing to the address solving function possessed by the LAN emulation server (LES). The LAN emulation terminal comes into the operating status owing to the connections to the group of those servers.

Figure 4:
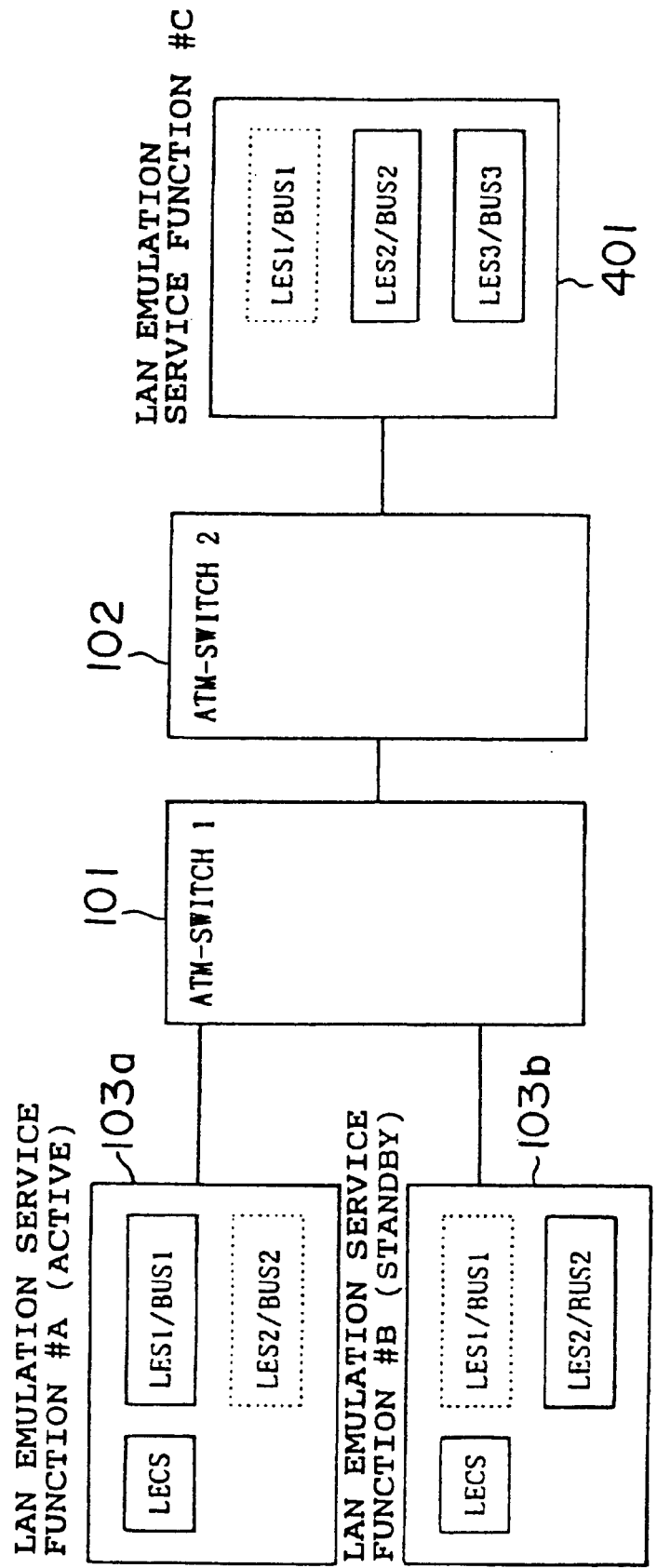
FIG. 4 is an explanatory diagram (1) showing load decentralization of a LAN emulation in the embodiment of the present invention.
Figure 5:
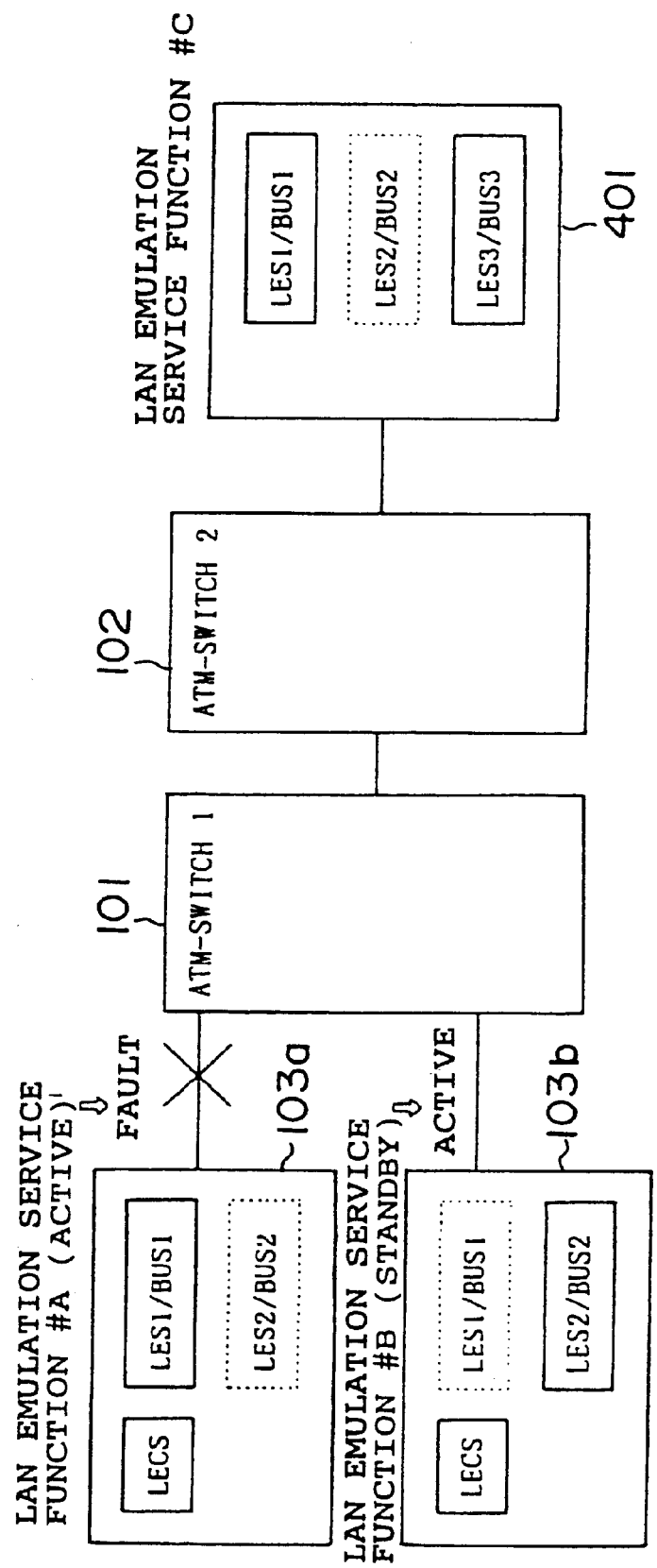
FIG. 5 is an explanatory diagram 82) showing the load decentralization of the LAN emulation in the embodiment of the present invention.

FIGS. 4 and 5 show an applied version of this embodiment, wherein a plurality of server registration tables 402a, 402b and 403a–403c are set respectively in the dual LAN emulation configuration servers 103a, 103b. 401, and the same management information is set in these tables. The management information in those server registration tables is provided to set a corresponding relationship between the LAN emulation server (LEC) and the address set server (BUS) for the LAN emulation.

Referring to FIG. 4, LES1/BUS1 is set in the LAN emulation configuration server 103a, LES2/BUS2 is set in the server 103b, and LES2/BUS2 and LES3/BUS3 are set in the server 401.

Then, the line between the LAN emulation configuration server 103a and the ATM switch 101 is set so that a line fault occurs when coming into an overload state. This setting can be easily done by setting a fault detection program of the fault detecting unit 605 of the signaling processing unit 604.

Next, as illustrated in FIG. 5, if the connection to the LAN emulation configuration server 103a functioning as the active system is detected as being in the fault status due to the overload of the line, the active and standby systems are switched over based on the construction and the processes explained in FIGS. 3–8, whereby the ATM switch 101 is connected to the LAN emulation configuration server 103b.

A function of the server registration table LES1/BUS1 is thereby assigned to the LAN emulation server 401, and the loads of the LAN emulations of the whole network are decentralized. At this time, if a sum of the loads of LES1/BUS1 and LES3/BUS3 falls within an allowable range of the LAN emulation server 401, it follows that the LAN emulation normally operates.

Note that the embodiments discussed above have dealt with the construction in which the LAN emulation configuration server (LECS), the LAN emulation server (LES) and the address set server (BUS) for the LAN emulation, are connected to the ATM switch 101 but may also be, as functional units, built in the ATM switch 101.

According to the present invention, it is feasible to provide the system capable of avoiding the fault without making the line dual by the local dual structure on the premise that the LAN emulation system is provided with the dual LAN emulation servers.

It is apparent that, in this invention, a wide range of different working modes can be formed based on the invention without deviating from the spirit and scope of the invention. This invention is not restricted by its specific working modes except being limited by the appended claims.

What is claimed is:

1. A LAN emulation system comprising:
   an ATM switch to which a LAN emulation terminal is connected, said ATM switch including line fault detecting means, a routing table in which to define a correspondence between a specified address and a line, and a line status table rewritten based on a result of detection by said line fault detecting means; and
   a LAN emulation configuration server, connected to said ATM switch, for managing a LAN emulation in an ATM communication network, said server being constructed as a multi-server system where multiple servers are multiplexed together.

2. A LAN emulation system according to claim 1, wherein one or more LAN emulation execution servers and address set servers for the LAN emulation are connected to said LAN emulation configuration server, and
   said LAN emulation configuration server includes a server registration table in which to set a combination of a LAN emulation executing server connected to said LAN emulation configuration server and an address set server for the LAN emulation.

3. A LAN emulation system comprising:
   an ATM switch to which a LAN emulation terminal is connected, said ATM switch including line fault detecting means, a routing table in which to define a correspondence between a specified address and a line, and a line status table rewritten based on a result of detection by said line fault detecting means; and
   a LAN emulation configuration server, connected to said ATM switch, for managing a LAN emulation in an ATM communication network, said server being constructed as a multi-server system where multiple servers are multiplexed together;
   wherein one or more LAN emulation execution servers and address set servers for the LAN emulation are connected to said LAN emulation configuration server, and
   said LAN emulation configuration server is provided with a plurality of server registration tables for setting combination of a LAN emulation executing server connected to said LAN emulation configuration server and an address set server for the LAN emulation, and each server registration table is registered in each of said multiple servers of the multi-server system.

4. A LAN emulation system according to claim 1, wherein a well-known address for said LAN emulation configuration server is set as a specified address of said routing table.

5. An ATM switch connected to a LAN emulation configuration server, comprising:
   a control unit connecting two or more lines;
   a switch unit for switching the lines;
   a cell inserting/extracting unit for inserting and extracting cells transferred via the lines
   a signaling processing unit for detecting a fault in the lines; and
   a line correspondence data unit including a routing table in which to define a correspondence of a well-known address to a line of said two or more lines and a line status table rewritten based on a result of detection by said line fault detecting unit,
   wherein said routing table is set so as to lead a connection to the well-known address from an external terminal to said LAN emulation configuration server selectively from the two or more lines on the basis of a change in said line status table.

* * * * *